United States Patent
Fiebig et al.

(10) Patent No.: US 10,239,291 B2
(45) Date of Patent: *Mar. 26, 2019

(54) MULTI-LAYERED POLYMER FILM

(71) Applicant: Borealis AG, Vienna (AT)

(72) Inventors: Joachim Fiebig, St. Marien (AT); Kristin Reichelt, Neuhofen/Krems (AT)

(73) Assignee: Borealis AG, Vienna (AT)

( * ) Notice: Subject to any disclaimer, the term of this patent is extended or adjusted under 35 U.S.C. 154(b) by 419 days.

This patent is subject to a terminal disclaimer.

(21) Appl. No.: 14/888,304

(22) PCT Filed: Apr. 16, 2014

(86) PCT No.: PCT/EP2014/057691
§ 371 (c)(1),
(2) Date: Oct. 30, 2015

(87) PCT Pub. No.: WO2014/180639
PCT Pub. Date: Nov. 13, 2014

(65) Prior Publication Data
US 2016/0059524 A1    Mar. 3, 2016

(30) Foreign Application Priority Data

May 8, 2013  (EP) .................................... 13166933

(51) Int. Cl.
| | | |
|---|---|---|
| B32B 27/08 | (2006.01) | |
| B32B 27/32 | (2006.01) | |
| B32B 27/34 | (2006.01) | |
| B32B 27/36 | (2006.01) | |
| B32B 27/06 | (2006.01) | |
| B32B 15/08 | (2006.01) | |
| B32B 27/30 | (2006.01) | |
| B32B 15/085 | (2006.01) | |

(52) U.S. Cl.
CPC .............. *B32B 27/08* (2013.01); *B32B 15/08* (2013.01); *B32B 27/06* (2013.01); *B32B 27/306* (2013.01); *B32B 27/308* (2013.01); *B32B 27/32* (2013.01); *B32B 27/327* (2013.01); *B32B 27/34* (2013.01); *B32B 27/36* (2013.01); *B32B 15/085* (2013.01); *B32B 2270/00* (2013.01); *B32B 2307/31* (2013.01); *B32B 2307/518* (2013.01); *B32B 2307/558* (2013.01); *B32B 2307/5825* (2013.01); *B32B 2439/70* (2013.01)

(58) Field of Classification Search
CPC ... B32B 15/08; B32B 15/085; B32B 2270/00; B32B 2307/31; B32B 2307/518; B32B 2307/558; B32B 2307/5825; B32B 2439/70; B32B 27/06; B32B 27/08; B32B 27/306; B32B 27/308; B32B 27/32; B32B 27/327
USPC .................................................. 428/212, 220
See application file for complete search history.

(56) References Cited

U.S. PATENT DOCUMENTS

| | | |
|---|---|---|
| 2003/0105239 A1 | 6/2003 | Collina et al. |
| 2009/0171030 A1 | 7/2009 | Ikeda et al. |

FOREIGN PATENT DOCUMENTS

| | | |
|---|---|---|
| CN | 102089378 A | 6/2011 |
| DE | 10133903 A1 | 3/2002 |
| EP | 0 659 552 A1 | 6/1995 |
| EP | 2 143 760 A1 | 1/2010 |
| JP | S6395210 A | 4/1988 |
| JP | H0848837 A | 2/1996 |
| RU | 2011116767 A1 | 11/2012 |
| WO | 2010/052263 A1 | 5/2010 |
| WO | 2013000767 A1 | 1/2013 |
| WO | 03/051934 A2 | 6/2013 |

OTHER PUBLICATIONS

Resconi et al. Chemical Reviews (2000) vol. 100, No. 4, p. 1263.
International Search Report for International Patent Application No. PCT/EP2014/057691, dated Jun. 6, 2014.
Federal Service on Intellectual Property Search Report for Application No. 2015150742/05(078096). Filed Apr. 16, 2014.

*Primary Examiner* — Lawrence D Ferguson
(74) *Attorney, Agent, or Firm* — Warn Partners, P.C.

(57) ABSTRACT

The present invention relates to a multi-layered polymer film, comprising a sealing layer and a base layer, wherein the sealing layer comprises a polypropylene (SL-PP), and wherein the sealing layer polypropylene SL-PP comprises comonomer units derived from ethylene in an amount of from 0.5 wt % to 25 wt % and from at least one C5-12 alpha-olefin in an amount of from 0.5 mol % to 4.0 mol %, and has an amount of xylene solubles XS of at least 20 wt %, and the xylene solubles have an amount of ethylene-derived comonomer units of from 4 wt % to 50 wt %.

20 Claims, No Drawings

MULTI-LAYERED POLYMER FILM

CROSS REFERENCE TO RELATED APPLICATIONS

This application is a National Stage of International Application No. PCT/EP2014/057691, filed Apr. 16, 2014. This application claims priority to European Patent Application No. EP13166933.5 filed on May 8, 2013. The disclosures of the above applications are incorporated herein by reference.

Polypropylene is used in areas where sealing properties are relevant, e.g. in the food packaging industry.

Heat sealing is the predominant method of manufacturing flexible and semi-rigid packages. An important indication of good sealing performance is inter alia a low seal initiation temperature which is needed to support high speed on packaging machines. Furthermore, it is also desired to have a packaging material of improved impact strength and other mechanical properties such as high tear strength.

It frequently turns out that improvement of one of these properties is achieved on the expense of the other properties.

There is still a need to design multi-layered polymer materials which are useful as a packaging material and have a low sealing initiation temperature SIT while keeping mechanical film properties such as impact strength and/or tear strength on a high level.

According to a first aspect of the present invention, the object is solved by providing a multi-layered polymer film comprising at least one sealing layer and at least one base layer, wherein the sealing layer comprises a polypropylene (SL-PP), and said sealing layer polypropylene SL-PP comprises comonomer units derived from ethylene in an amount of from 0.5 wt % to 25 wt %, and from at least one $C_{5-12}$ alpha-olefin in an amount of from 0.5 mol % to 4.0 mol %, and has an amount of xylene solubles XS of at least 20 wt %, and the xylene solubles have an amount of ethylene-derived comonomer units of from 4 wt % to 50 wt %.

Preferably, the at least one $C_{5-12}$ alpha-olefin is selected from 1-hexene, 1-octene, or any mixture thereof.

As indicated above, the sealing layer polypropylene SL-PP comprises comonomer units derived from ethylene in an amount of from 0.5 wt % to 25 wt %.

In a preferred embodiment, the amount of the comonomer units derived from ethylene in the sealing layer polypropylene is from 0.8 wt % to 15 wt %, more preferably from 1.0 wt % to 10 wt %, even more preferably from 1.0 wt % to 6.0 wt %, like 1.0 wt % to 4.0 wt %.

As indicated above, the sealing layer polypropylene comprises comonomer units derived from at least one $C_{5-12}$ alpha-olefin in an amount of from 0.5 mol % to 4.0 mol %.

In a preferred embodiment, the amount of the comonomer units derived from the at least one $C_{5-12}$ alpha-olefin, more preferably from 1-hexene or 1-octene, in the sealing layer polypropylene is from 1.0 mol % to 3.0 mol %, more preferably from 1.5 mol % to 2.5 mol %.

If the $C_{5-12}$ alpha-olefin is 1-hexene and its amount is indicated in wt %, the amount of 1-hexene-derived comonomer units in the sealing layer polypropylene is preferably from 1.0% to 8.0 wt %, more preferably from 2.0 wt % to 6.0 wt %, even more preferably from 3.0 wt % to 5.0 wt %.

If the $C_{5-12}$ alpha-olefin is 1-octene and its amount is indicated in wt %, the amount of 1-octene-derived comonomer units in the sealing layer polypropylene is preferably from 1.5 wt % to 10 wt %, more preferably from 2.5 wt % to 7.5 wt %, even more preferably from 4.0 wt % to 6.5 wt %.

In a preferred embodiment, the heat sealing polypropylene does not contain any butene-derived (such as 1-butene-derived) comonomer units.

In a preferred embodiment, the sealing layer polypropylene is a terpolymer, wherein the $C_{5-12}$ alpha-olefin is preferably either 1-hexene or 1-octene. Thus, the heat sealing polypropylene is preferably either a terpolymer composition containing ethylene- and 1-hexene-derived comonomer units or alternatively a terpolymer composition containing ethylene- and 1-octene-derived comonomer units.

As indicated above, the sealing layer polypropylene has an amount of xylene solubles XS of at least 20 wt %.

The amount of xylene solubles XS (sometimes also referred to as xylene cold solubles XCS) is a parameter frequently used to determine the amount of those components within a polymer composition which are mainly amorphous and/or elastomeric or of low crystallinity. The measuring method is described in further detail below under the headline "Measuring Methods". As a first approximation, the amount of the xylene solubles XS corresponds to the amount of rubber and those polymer chains of the matrix with low molecular weight and low stereoregularity.

Preferably, the amount of xylene solubles XS of the sealing layer polypropylene is from 20 wt % to 60 wt %, more preferably from 20 wt % to 50 wt % even more preferably from 20 wt % to 42 wt %.

As indicated above, the xylene solubles of the sealing layer polypropylene have an amount of ethylene-derived comonomer units of from 4 wt % to 50 wt %.

In a preferred embodiment, the amount of the ethylene-derived comonomer units in the xylene solubles is from 5 wt % to 30 wt %, more preferably from 5 wt % to 20 wt %, even more preferably from 5 wt % to 12 wt %.

In the present invention, it is preferred that that the majority of the ethylene-derived comonomer units of the sealing layer polypropylene are present in the elastomeric parts or domains of the composition.

Accordingly, in a preferred embodiment, the sealing layer polypropylene satisfies the following relation:

$$[C_2(XS) \times XS/100]/C_2(\text{total}) \geq 0.90$$

wherein $C_2(XS)$ is the amount in wt % of the ethylene-derived comonomer units in the xylene soluble of the sealing layer polypropylene, $XS$ is the amount in wt % of xylene solubles of the sealing layer polypropylene, and $C_2(\text{total})$ is the amount in wt % of the ethylene-derived comonomer units in the sealing layer polypropylene.

In a preferred embodiment, $[C_2(XS) \times XS/100]/C_2(\text{total}) \geq 0.95$; even more preferably $1.0 \geq [C_2(XS) \times XS/100]/C_2(\text{total}) \geq 0.95$.

Preferably, the xylene solubles of the sealing layer polypropylene contain an amount of comonomer units which are derived from the least one $C_{5-12}$ alpha-olefin such as 1-hexene and/or 1-octene of from 0.01 mol % to 2.0 mol %, more preferably from 0.05 mol % to 1.0 mol %.

If the $C_{5-12}$ alpha-olefin is 1-hexene and its amount is indicated in wt %, the amount of 1-hexene-derived comonomer units in the xylene solubles is preferably from 0.02 wt % to 4.0 wt %, more preferably from 0.1 wt % to 2.0 wt %.

If the $C_{5-12}$ alpha-olefin is 1-octene and its amount is indicated in wt %, the amount of 1-octene-derived comonomer units in the xylene solubles is preferably from 0.03 wt % to 5.0 wt %, more preferably from 1.3 wt % to 2.5 wt %.

In the present invention, it can be preferred that the majority of the $C_{5-12}$ alpha-olefin-derived monomer units is present in the crystalline parts or domains of the sealing layer polypropylene, whereas only a minor part is present in the elastomeric parts or domains.

Thus, according to a preferred embodiment, the sealing layer polypropylene satisfies with the following relation:

$$[C_{5-12}(XS) \times XS/100]/C_{5-12}(\text{total}) \leq 0.30$$

wherein
$C_{5-12}(XS)$ is the amount in wt % of the $C_{5-12}$ alpha-olefin-derived comonomer units in the xylene solubles of the sealing layer polypropylene,
XS is the amount in wt % of xylene solubles of the sealing layer polypropylene,
$C_{5-12}(\text{total})$ is the amount in wt % of the $C_{5-12}$ alpha-olefin-derived comonomer units in the sealing layer polypropylene.

In a preferred embodiment, $[C_{5-12}(XS) \times XS/100]/C_{5-12}(\text{total}) \leq 0.25$,
more preferably $[C_{5-12}(XS) \times XS/100]/C_{5-12}(\text{total}) \leq 0.20$,
even more preferably $0.01 \leq [C_{5-12}(XS) \times XS/100]/C_{5-12}(\text{total}) \leq 0.30$,
like $0.01 \leq [C_{5-12}(XS) \times XS/100]/C_{5-12}(\text{total}) \leq 0.25$,
or $0.01 \leq [C_{5-12}(XS) \times XS/100]/C_{5-12}(\text{total}) \leq 0.20$.

Preferably, the total amount of comonomer units, more preferably of the comonomer units derived from ethylene and at least one $C_{5-12}$ alpha-olefin, in the sealing layer polypropylene is preferably from 1.7 mol % to 33 mol %, more preferably from 2.5 mol % to 14 mol %, even more preferably from 3.0 mol % to 8.5 mol %.

If the $C_{5-12}$ alpha-olefin is 1-hexene and its amount is indicated in wt %, the total amount of ethylene- and 1-hexene-derived comonomer units in the sealing layer polypropylene is preferably from 2.5 wt % to 31 wt %, more preferably from 4.0 wt % to 9 wt %.

If the $C_{5-12}$ alpha-olefin is 1-octene and its amount is indicated in wt %, the total amount of ethylene- and 1-octene-derived comonomer units in the sealing layer polypropylene is preferably from 3.0 wt % to 30 wt %, more preferably from 5.0 wt % to 11 wt %.

Melt flow rate MFR (2.16 kg, 230° C.) of the sealing layer polypropylene can be varied over a broad range. Preferably, the sealing layer polypropylene has a melt flow rate MFR (2.16 kg, 230° C.) of from 0.5 to 30 g/10 min, preferably from 1.0 to 25 g/10 min, more preferably from 2.0 to 15 g/10 min.

The xylene solubles of the sealing layer polypropylene may have an intrinsic viscosity IV of at least 0.7 dl/g, more preferably of from 0.7 to 3.0 dl/g, even more preferably of from 0.7 to 2.0 dl/g, such as 0.8 to 1.8 dl/g.

The xylene soluble of the sealing layer polypropylene can be completely amorphous or may still have some degree of crystallinity. Preferably the xylene solubles have some crystallinity and the melting enthalpy $\Delta H_m(XS)$ of the xylene solubles is preferably within the range of from 0.5 to 60 J/g, more preferably from 0.5 to 50 J/g.

The sealing layer polypropylene can be made of just one propylene polymer fraction (i.e. prepared in a single step polymerization process) or may alternatively be made of a mixture of two or more (e.g. three) propylene polymer fractions which are preferably prepared in a sequence of at least two (e.g. three) polymerization reactors (i.e. so-called reactor-blending).

In a preferred embodiment, the sealing layer polypropylene is a reactor blend. Preferably, the reactor blend comprises at least two, more preferably at least three different propylene polymer fractions prepared by sequential polymerization in at least three polymerization reactors.

In a preferred embodiment, the sealing layer polypropylene is a blend, preferably a reactor blend, comprising the following propylene polymer fractions P1, P2 and P3:

(P1) a propylene homopolymer or a propylene copolymer comprising comonomer units derived from at least one $C_{5-12}$ alpha-olefin in an amount of less than 1.0 mol %, more preferably of from 0.1 to less than 1.0 mol % or from 0.2 to less than 1.0 mol %, (P2) a propylene copolymer comprising comonomer units derived from at least one $C_{5-12}$ alpha-olefin in an amount of from 2.0 mol % to 7.0 mol %, more preferably in an amount of from 2.5 mol % to 6.0 mol %, and (P3) a propylene copolymer comprising ethylene-derived comonomer units in an amount of from 4.0 wt % to 50 wt %, more preferably 5.0 wt % to 30 wt %, even more preferably 5.0 wt % to 20 wt % or from 5.0 wt % to 12 wt %.

Preferably, each of the propylene polymer fractions P1 and P2 contains less than 1.0 wt % of ethylene-derived comonomer units, more preferably neither P1 nor P2 contains ethylene-derived comonomer units.

If the propylene polymer fraction P1 contains comonomer units derived from at least one $C_{5-12}$ alpha-olefin such as 1-hexene and/or 1-octene, it is preferably the same $C_{5-12}$ alpha-olefin as in the propylene polymer fraction P2.

Optionally, the propylene polymer fraction P3 may additionally contain comonomer units derived from at least one $C_{5-12}$ alpha-olefin, such as 1-hexene or 1-octene. If present, it is preferably the same $C_{5-12}$ alpha-olefin as in polymer component P2. In a preferred embodiment, the propylene polymer fraction P3 contains less than 2.0 mol %, more preferably from 0.1 mol % to less than 1.0 mol % of comonomer units derived from at least one $C_{5-12}$ alpha-olefin.

Preferably, the propylene polymer fraction P1 is present in the sealing layer polypropylene in an amount of from 20 to 50 wt %, more preferably from 20 to 45 wt %, based on the total weight of P1+P2+P3.

Preferably, the propylene polymer fraction P2 is present in the sealing layer polypropylene in an amount of from 20 to 50 wt %, more preferably from 20 to 45 wt %, based on the total weight of P1+P2+P3.

Preferably, the propylene polymer fraction P3 is present in the sealing layer polypropylene in an amount of from 20 to 60 wt %, more preferably from 20 to 50 wt %, based on the total weight of P1+P2+P3.

In a preferred embodiment, the sealing layer polypropylene is a heterophasic polypropylene comprising a polymer matrix and a dispersed polymer phase (i.e. dispersed in said matrix).

Preferably, the dispersed polymer phase comprises the propylene polymer fraction P3 as described above.

Preferably, the propylene polymer fraction P1 has a melt flow rate MFR (2.16 kg/230° C.) of from 1 to 20 g/10 min, more preferably from 2 to 10 g/10 min.

Preferably, the propylene polymer fraction P2 has a melt flow rate MFR (2.16 kg/230° C.) of less than 30 g/10 min.

Preferably, the propylene polymer fraction P3 has an intrinsic viscosity IV of at least 0.7 dl/g, more preferably of from 0.7 to 3.0 dl/g, even more preferably 0.7 to 2.0 dl/g or from 0.8 to 1.8 dl/g.

Preferably, the amounts of xylene solubles of the mixture of the propylene polymer fraction P1 and the propylene polymer fraction P2 are less than 10 wt %.

In principle, the sealing layer may not only comprise the sealing layer polypropylene SL-PP described above but also other polymers. However, in a preferred embodiment, the SL-PP is the only polymer which is present in the sealing layer.

In a preferred embodiment, the sealing layer polypropylene described above represents at least 70 wt %, more preferably at least 80 wt %, even more preferably at least 90 wt % or even 95 wt % of the sealing layer, based on the total weight of the sealing layer.

The sealing layer may contain additives known in the art, like antioxidants, nucleating agents, slip agents and antistatic agents. Typically the sealing layer does not contain more than 7 wt.-%, more preferably not more than 5 wt.-%, or not more than 2.5 wt.-% of additives mentioned herein, based on the total weight of the sealing layer.

As indicated above, the multi-layered polymer film comprises a base layer. As used herein, the phrase "base layer" although singular, may refer to one or more layers, like to 2 to 5 layers, i.e. 2, 3, 4, or 5 layers, that form the core of the multi-layered polymer film.

Appropriate base layers that can be used in combination with a sealing layer and have the desired properties such as good stiffness or barrier properties are generally known to the skilled person. Preferably, the base layer comprises a polyvinyl alcohol, a poly(meth)acrylate, a polyamide, a polyester such as poly(ethylene terephthalate), a polyolefin, or any mixture thereof.

Accordingly it is in particular preferred that the base layer is a polyolefin, more preferably a polyethylene or polypropylene, still more preferably a propylene homopolymer or a propylene copolymer.

In case of a propylene copolymer, said copolymer has preferably a comonomer content between 0.1 and 5 wt.-%, the comonomers are ethylene and/or $C_4$ to $C_8$ α-olefins, preferably ethylene, 1-butene or 1-hexene. Preferably, the propylene copolymer forming the base layer has an amount of xylene solubles of less than 15 wt %, more preferably of from 1 to 10 wt %, even more preferably of from 2 to 8 wt %.

The polypropylene (either a propylene homo- or copolymer) of the base layer can have a melt flow rate MFR (2.16 kg, 230° C.) in the range of from 1.0 to 15.0 g/10 min, more preferably in the range of 1.0 to 10.0 g/10 min.

If the base layer polypropylene is a propylene copolymer, it preferably has a melting temperature Tm of at least 135° C., preferably at least 140° C., more preferably in the range of 140 to 150° C., like in the range of 140 to 145° C.

If the base layer polypropylene is a propylene homopolymer, it preferably has a melting temperature Tm of at least 145° C., preferably at least 150° C.

In addition to the sealing layer(s) and the base layer(s) described above, the multi-layered polymer film may comprise one or more additional layers, such as a metal layer and/or an outer layer.

According to a preferred embodiment, the multi-layered polymer film comprises, preferably consists of, three layers, namely a base layer, a sealing layer and (a) an outer layer,
or
(b) a further sealing layers,
or
(c) a metal layer,
wherein the multi-layered polymer film has the following layer sequence:
(a1) sealing layer-base layer-outer layer,
or
(b1) sealing layer-base layer-sealing layer,
or
(c1) sealing layer-base layer-metal layer.

In one preferred embodiment, the multi-layered polymer film comprises at least three layers, namely at least one base layer and two sealing layers, namely a first sealing layer and a second sealing layer, wherein the multi-layered polymer film has the following layer sequence: first sealing layer-base layer-second sealing layer. Accordingly in one preferred embodiment the (two) sealing layer(s) are directly co-extruded with the base layer. Thus, in one preferred embodiment, the multi-layered polymer film consists of two sealing layers and one base layer having the following layer sequence: first sealing layer-base layer-second sealing layer. The first sealing layer and second sealing layer can be chemically different or identical. In one embodiment the first sealing layer and second sealing layer are chemically identical.

In another preferred embodiment the multi-layered polymer film comprises at least three layers, namely a base layer, a sealing layer and a metal layer, wherein the sealing layer is located, i.e. joined, on the one side (surface) of the base layer and the metal layer is located, i.e. joined, on the other side (surface) of the base layer. Accordingly the multi-layered polymer film has the following layer sequence: sealing layer-base layer-metal layer. Preferably the sealing layer is co-extruded with the base layer and subsequently the base layer is metalized.

In another preferred embodiment the multi-layered polymer film comprises at least three layers, namely a base layer, a sealing layer and an outer layer, wherein the sealing layer is located, i.e. joined, on the one side (surface) of the base layer and the outer layer is located, i.e. joined, on the other side (surface) of the base layer. Accordingly the multi-layered polymer film has the following layer sequence: sealing layer-base layer-outer layer. Preferably the sealing layer and the outer layer are co-extruded with the base layer.

The outer layer—if present—is preferably a polyolefin. With regard to appropriate properties of the polyolefin of the outer layer, reference can be made to the information provided above for the polyolefin used as the base layer. In one preferred embodiment, the outer layer is a polyethylene or a polypropylene.

The thickness of the base layer is preferably in the range of 4 to 180 µm, more preferably in the range of 5 to 120 µm, even more preferably in the range of 7 to 70 µm, most preferably in the range of 10 to 35 µm.

Preferably the sealing layer(s) has/have a thickness that is substantially less than the thickness of the base layer and substantially less than the total thickness of the multi-layered polymer film. In one embodiment the thickness of the sealing layer(s) is/are less than 40%, of the thickness of the base layer. Accordingly, the sealing layer (if two or more sealing layers are present, then each sealing layer) may typically have a thickness in the range of 3 to 40 µm, preferably in the range of 3 to 25 µm, more preferably in the range of 8 to 20 µm.

Preferably, the ratio of the thickness of the sealing layer to the thickness of the base layer is in the range of from 1/10 to 9/10, more preferably 1/4 to 2/3.

The outer layer—if present—may have a thickness in the range of 0.5 to 50 μm, more preferably in the range of 1 to 30 μm.

Layer thickness can be measured by methods commonly known to the skilled person, such as scanning electron microscopy.

As mentioned above, a low sealing initiation temperature SIT can be accomplished with the multi-layered polymer film of the present invention. Preferably, the multi-layered polymer film has a sealing initiation temperature SIT of 110° C. or less, more preferably 105° C. or less.

The multi-layered polymer film of the present invention can be orientated, e.g. uniaxially or biaxially oriented, or non-orientated. If orientated, this may apply to the base layer and sealing layer and other optional layers. Alternatively, it is possible that only some layers of the multi-layered polymer film are orientated whereas at least one layer is non-orientated.

Preferably, the multi-layered polymer film is a multi-layered cast film, a multi-layered blown film, or a multi-layered biaxially orientated film, or a combination thereof.

Preferably, the multi-layered polymer film has a thickness in the range of 10 to 200 μm, more preferably in the range of 15 to 100 μm, even more preferably in the range of 20 to 80 μm, like in the range of 20 to 60 μm.

These types of multi-layered polymer films can be prepared by standard methods commonly known to the skilled person.

The polypropylene of the sealing layer described above can be prepared via a single step or a multi-step polymerization process. If prepared in a multi-step polymerization process, it is preferred to carry out polymerization in a sequence of several (e.g. at least two or three) reactors, i.e. so-called reactor-blending.

If the sealing layer polypropylene is prepared via a multi-step process, said process may comprise the following steps:
(i) preparing as a first propylene polymer fraction a propylene homopolymer or a propylene copolymer comprising comonomer units derived from at least one $C_{5-12}$ alpha-olefin in a first polymerization reactor PR1,
(ii) transferring the first propylene polymer fraction obtained in the first polymerization reactor to a second polymerization reactor PR2 and preparing a second propylene polymer fraction by polymerizing propylene and at least one $C_{5-12}$ alpha-olefin in the presence of the first propylene polymer fraction, thereby obtaining a reactor blend of the first and second propylene polymer fractions,
(iii) transferring the reactor blend of step (ii) into a third polymerization reactor PR3 and preparing a third propylene polymer fraction by polymerizing propylene and ethylene in the presence of the reactor blend of step (ii), thereby obtaining a reactor blend of the first, second and third propylene polymer fractions.

If present in step (i), the at least one $C_{5-12}$ alpha-olefin is preferably the same as in step (ii).

Preferably, no separate $C_{5-12}$ alpha-olefin feed is introduced into the third polymerization reactor PR3. However, the third polymerization reactor PR3 may contain unreacted C5-12 alpha-olefin from the second polymerization reactor PR2.

Preferably, the first, second and third propylene polymer fractions prepared in steps (i), (ii) and (iii) correspond to those fractions as already described above, i.e. propylene polymer fractions P1, P2, and P3.

Preferably, the split between the first propylene polymer fraction of PR1 and the second propylene polymer fraction of PR2 is 70/30 to 30/70, more preferably 60/40 to 40/60.

Preferably, the split between the reactor blend of step (ii) (i.e. the fractions of PR1 and PR2) and the third propylene polymer fraction of PR3 is 80/20 to 40/60, more preferably 80/20 to 50/50.

Preferably, the first polymerization reactor PR1 is a slurry reactor, such as a loop reactor.

Appropriate conditions for operating a slurry reactor such as a loop reactor and how to adjust and fine-tune final polymer properties are generally known to the skilled person or can be determined by routine experimentation. Exemplary operation conditions in the slurry reactor may be as follows:
temperature within the range of 40° C. to 110° C., more preferably between 60° C. and 100° C.,
pressure within the range of 20 bar to 80 bar, more preferably between 40 bar to 70 bar,
hydrogen can be added for controlling the molar mass in a manner known per se.

Preferably, the second and third polymerization reactors are both a gas phase reactor.

Appropriate conditions for operating a gas phase reactor and how to adjust and fine-tune final polymer properties are generally known to the skilled person or can be determined by routine experimentation. Exemplary operation conditions in the gas phase reactor may be as follows:
temperature within the range of 50° C. to 130° C., more preferably between 60° C. and 100° C.,
pressure within the range of 5 bar to 50 bar, more preferably between 15 bar to 40 bar,
hydrogen can be added for controlling the molar mass in a manner known per se.

Optionally, a pre-polymerization reactor is operated up-stream the first polymerization reactor PR1.

Preferably, a catalyst composition comprising a single site catalyst is used in at least one of the polymerization reactors PR1 to PR3. In a preferred embodiment, the same single site catalyst is used in all polymerization reactors PR1 to PR3.

Catalyst compositions based on single site catalysts such as metallocene compounds are generally known to the skilled person.

The catalyst composition can be supported on an external support material or carrier such as an inorganic oxide (e.g. a silica support of sufficiently high pore volume and/or BET surface area).

Alternatively, it can be preferred to use a catalyst composition comprising solid catalyst particles which do not contain any external support material. This type of catalyst composition is described e.g. in WO 03/051934 and can be prepared by an emulsion solidification technology.

In a preferred embodiment, the catalyst composition is a solid catalyst system (SCS) which has a specific surface area measured according to ASTM D 3663 of lower than 25 $m^2/g$.

Preferably the solid catalyst system (SCS) has a specific surface area of lower than 15 $m^2/g$, yet still lower than 10 $m^2/g$ and most preferred lower than 5 $m^2/g$, which is the lowest measurement limit. The specific surface area is measured according to ASTM D 3663 ($N_2$).

Furthermore the solid catalyst system (SCS) typically has a mean particle size of not more than 500 μm, i.e. preferably in the range of 2 to 500 μm, more preferably 5 to 200 μm. It is in particular preferred that the mean particle size is below 80 μm, still more preferably below 70 μm. A preferred range for the mean particle size is 5 to 70 μm, or even 10 to 60 μm.

As stated above the transition metal (M) is preferably zirconium (Zr) or hafnium (Hf), preferably zirconium (Zr).

The term "σ-ligand" is understood in the whole description in a known manner, i.e. a group bound to the metal via a sigma bond. Thus the anionic ligands "X" can independently be halogen or be selected from the group consisting of R', OR', SiR'$_3$, OSiR'$_3$, OSO$_2$CF$_3$, OCOR', SR', NR'$_2$ or PR'$_2$ group wherein R' is independently hydrogen, a linear or branched, cyclic or acyclic, $C_1$ to $C_{20}$ alkyl, $C_2$ to $C_{20}$ alkenyl, $C_2$ to $C_{20}$ alkynyl, $C_3$ to $C_{12}$ cycloalkyl, $C_6$ to $C_{20}$ aryl, $C_7$ to $C_{20}$ arylalkyl, $C_7$ to $C_{20}$ alkylaryl, $C_8$ to $C_{20}$ arylalkenyl, in which the R' group can optionally contain one or more heteroatoms belonging to groups 14 to 16. In a preferred embodiments the anionic ligands "X" are identical and either halogen, like Cl, or methyl or benzyl.

A preferred monovalent anionic ligand is halogen, in particular chlorine (Cl). The substituted cyclopentadienyl-type ligand(s) may have one or more substituent(s) being selected from the group consisting of halogen, hydrocarbyl (e.g. $C_1$ to $C_{20}$ alkyl, $C_2$ to $C_{20}$ alkenyl, $C_2$ to $C_{20}$ alkynyl, $C_3$ to $C_{20}$ cycloalkyl, like $C_1$ to $C_{20}$ alkyl substituted $C_5$ to $C_{20}$ cycloalkyl, $C_6$ to $C_{20}$ aryl, $C_5$ to $C_{20}$ cycloalkyl substituted $C_1$ to $C_{20}$ alkyl wherein the cycloalkyl residue is substituted by $C_1$ to $C_{20}$ alkyl, $C_7$ to $C_{20}$ arylalkyl, $C_3$ to $C_{12}$ cycloalkyl which contains 1, 2, 3 or 4 heteroatom(s) in the ring moiety, $C_6$ to $C_{20}$-heteroaryl, $C_1$ to $C_{20}$-haloalkyl, —SiR"$_3$, —SR", —PR"$_2$ or —NR"$_2$, each R" is independently a hydrogen or hydrocarbyl (e. g. $C_1$ to $C_{20}$ alkyl, $C_1$ to $C_{20}$ alkenyl, $C_2$ to $C_{20}$ alkynyl, $C_3$ to $C_{12}$ cycloalkyl, or $C_6$ to $C_{20}$ aryl) or e.g. in case of —NR"$_2$, the two substituents R" can form a ring, e.g. five- or six-membered ring, together with the nitrogen atom wherein they are attached to.

Further "R" of formula (I) is preferably a bridge of 1 to 4 atoms, such atoms being independently carbon (C), silicon (Si), germanium (Ge) or oxygen (O) atom(s), whereby each of the bridge atoms may bear independently substituents, such as $C_1$ to $C_{20}$-hydrocarbyl, tri($C_1$ to $C_{20}$-alkyl)silyl, tri($C_1$ to $C_{20}$-alkyl)siloxy and more preferably "R" is a one atom bridge like e.g. —SiR'"$_2$—, wherein each R'" is independently $C_1$ to $C_{20}$-alkyl, $C_2$ to $C_{20}$-alkenyl, $C_2$ to $C_{20}$-alkynyl, $C_3$ to $C_{12}$ cycloalkyl, $C_6$ to $C_{20}$-aryl, alkylaryl or arylalkyl, or tri($C_1$ to $C_{20}$ alkyl)silyl-residue, such as trimethylsilyl-, or the two R'" can be part of a ring system including the Si bridging atom.

In a preferred embodiment the transition metal compound has the formula (II)

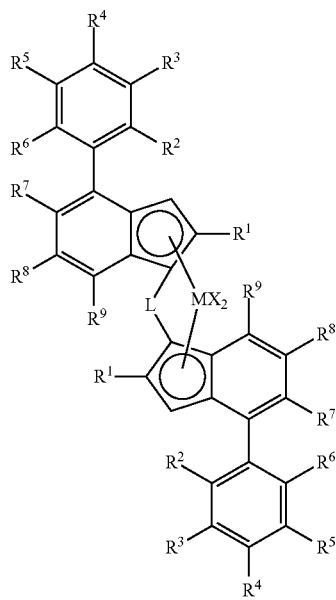

wherein
M is zirconium (Zr) or hafnium (Hf), preferably zirconium (Zr),

X are ligands with a σ-bond to the metal "M", preferably those as defined above for formula (I), preferably chlorine (Cl) or methyl (CH$_3$), the former especially preferred, $R^1$ are equal to or different from each other, preferably equal to, and are selected from the group consisting of linear saturated $C_1$ to $C_{20}$ alkyl, linear unsaturated $C_1$ to $C_{20}$ alkyl, branched saturated $C_1$-$C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, and $C_7$ to $C_{20}$ arylalkyl, optionally containing one or more heteroatoms of groups 14 to 16 of the Periodic Table (IUPAC), preferably are equal to or different from each other, preferably equal to, and are $C_1$ to $C_{10}$ linear or branched hydrocarbyl, more preferably are equal to or different from each other, preferably equal to, and are $C_1$ to $C_6$ linear or branched alkyl, $R^2$ to $R^6$ are equal to or different from each other and are selected from the group consisting of hydrogen, linear saturated $C_1$-$C_{20}$ alkyl, linear unsaturated $C_1$-$C_{20}$ alkyl, branched saturated $C_1$-$C_{20}$ alkyl, branched unsaturated $C_1$-$C_{20}$ alkyl, $C_3$-$C_{20}$ cycloalkyl, $C_6$-$C_{20}$ aryl, $C_7$-$C_{20}$ alkylaryl, and $C_7$-$C_{20}$ arylalkyl, optionally containing one or more heteroatoms of groups 14 to 16 of the Periodic Table (IUPAC), preferably are equal to or different from each other and are $C_1$ to $C_{10}$ linear or branched hydrocarbyl, more preferably are equal to or different from each other and are $C_1$ to $C_6$ linear or branched alkyl, $R^7$ and $R^8$ are equal to or different from each other and selected from the group consisting of hydrogen, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, $C_7$ to $C_{20}$ arylalkyl, optionally containing one or more heteroatoms of groups 14 to 16 of the Periodic Table (IUPAC), SiR$^{10}_3$, GeR$^{10}_3$, OR$^{10}$, SR$^{10}$ and NR$^{10}_2$, wherein
R$^{10}$ is selected from the group consisting of linear saturated $C_1$-$C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, and $C_7$ to $C_{20}$ arylalkyl, optionally containing one or more heteroatoms of groups 14 to 16 of the Periodic Table (IUPAC), and/or
$R^7$ and $R^8$ being optionally part of a $C_4$ to $C_{20}$ carbon ring system together with the indenyl carbons to which they are attached, preferably a $C_5$ ring, optionally one carbon atom can be substituted by a nitrogen, sulfur or oxygen atom, $R^9$ are equal to or different from each other and are selected from the group consisting of hydrogen, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, $C_7$ to $C_{20}$ arylalkyl, OR$^{10}$, and SR$^{10}$, preferably $R^9$ are equal to or different from each other and are H or CH$_3$, wherein R[10] is defined as before, L is a bivalent group bridging the two indenyl ligands, preferably being a $C_2R^{11}_4$ unit or a $SiR^{11}_2$ or $GeR^{11}_2$, wherein, R[11] is selected from the group consisting of H, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl or $C_7$ to $C_{20}$ arylalkyl, optionally containing one or more heteroatoms of groups 14 to 16 of the Periodic Table (IUPAC), preferably $Si(CH_3)_2$, $SiCH_3C_6H_{11}$, or $SiPh_2$, wherein $C_6H_{11}$ is cyclohexyl.

Preferably the transition metal compound of formula (II) is $C_2$-symmetric or pseudo-$C_2$-symmetric. Concerning the definition of symmetry it is referred to Resconi et al. Chemical Reviews, 2000, Vol. 100, No. 4 1263 and references herein cited.

Preferably the residues R[1] are equal to or different from each other, more preferably equal, and are selected from the group consisting of linear saturated $C_1$ to $C_{10}$ alkyl, linear unsaturated $C_1$ to $C_{10}$ alkyl, branched saturated $C_1$ to $C_{10}$ alkyl, branched unsaturated $C_1$ to $C_{10}$ alkyl and $C_7$ to $C_{12}$ arylalkyl. Even more preferably the residues R[1] are equal to or different from each other, more preferably equal, and are selected from the group consisting of linear saturated $C_1$ to $C_6$ alkyl, linear unsaturated $C_1$ to $C_6$ alkyl, branched saturated $C_1$ to $C_6$ alkyl, branched unsaturated $C_1$ to $C_6$ alkyl and $C_7$ to $C_{10}$ arylalkyl. Yet more preferably the residues R[1] are equal to or different from each other, more preferably equal, and are selected from the group consisting of linear or branched $C_1$ to $C_4$ hydrocarbyl, such as for example methyl or ethyl.

Preferably the residues R[2] to R[6] are equal to or different from each other and linear saturated $C_1$ to $C_4$ alkyl or branched saturated $C_1$ to $C_4$ alkyl. Even more preferably the residues R[2] to R[6] are equal to or different from each other, more preferably equal, and are selected from the group consisting of methyl, ethyl, iso-propyl and tert-butyl.

Preferably R[7] and R[8] are equal to or different from each other and are selected from hydrogen and methyl, or they are part of a 5-methylene ring including the two indenyl ring carbons to which they are attached. In another preferred embodiment, R[7] is selected from $OCH_3$ and $OC_2H_5$, and R[8] is tert-butyl.

In a preferred embodiment the transition metal compound is rac-methyl(cyclohexyl)silanediyl bis(2-methyl-4-(4-tert-butylphenyl)indenyl)zirconium dichloride.

In another preferred embodiment, the transition metal compound is rac-dimethylsilanediyl bis(2-methyl-4-phenyl-1,5,6,7-tetrahydro-s-indacen-1-yl)zirconium dichloride.

In another preferred embodiment, the transition metal compound is rac-dimethylsilanediyl bis(2-methyl-4-phenyl-5-methoxy-6-tert-butylindenyl)zirconium dichloride.

Preferably, the solid catalyst system (SCS) comprises a cocatalyst comprising an element of group 13 of the periodic table (IUPAC), for instance the cocatalyst comprises a compound of Al.

Examples of such cocatalyst are organo aluminium compounds, such as aluminoxane compounds.

Particularly preferred cocatalysts are the aluminoxanes, in particular the $C_1$ to $C_{10}$-alkylaluminoxanes, most particularly methylaluminoxane (MAO).

Preferably, the organo-zirconium compound of formula (I) and the cocatalyst (Co) of the solid catalyst system (SCS) represent at least 70 wt %, more preferably at least 80 wt %, even more preferably at least 90 wt %, even further preferably at least 95 wt % of the solid catalyst system. Thus it is appreciated that the solid catalyst system is featured by the fact that it is self-supported, i.e. it does not comprise any catalytically inert support material, like for instance silica, alumina or $MgCl_2$ or porous polymeric material, which is otherwise commonly used in heterogeneous catalyst systems, i.e. the catalyst is not supported on external support or carrier material. As a consequence of that the solid catalyst system (SCS) is self-supported and it has a rather low surface area.

The present invention will now be described in further detail by the following Examples.

EXAMPLES

I. Measuring Methods

If not otherwise indicated, the parameters mentioned in the present application are measured by the methods outlined below.

1. Comonomer Content by NMR Spectroscopy

Quantitative nuclear-magnetic resonance (NMR) spectroscopy was used to quantify the tacticity, regio-regularity and comonomer content of the polymers. Quantitative $^{13}C$ {$^1H$} NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. Standard single-pulse excitation was employed utilising the NOE at short recycle delays and the RS-HEPT decoupling scheme. A total of 1024 (1 k) transients were acquired per spectra.

Quantitative $^{13}C$ {$^1H$} NMR spectra were processed, integrated and relevant quantitative properties determined from the integrals. All chemical shifts are internally referenced to the methyl isotactic pentad (mmmm) at 21.85 ppm. Characteristic signals corresponding to regio defects and comonomer were observed.

The tacticity distribution was quantified through integration of the methyl region between 23.6-19.7 ppm correcting for any sites not related to the stereo sequences of interest.

Specifically the influence of regio defects and comonomer on the quantification of the tacticity distribution was corrected for by subtraction of representative regio defect and comonomer integrals from the specific integral regions of the stereo sequences.

The isotacticity was determined at the triad level and reported as the percentage of isotactic triad (mm) sequences with respect to all triad sequences:

[mm] %=100*(mm/(mm+mr+rr))

where mr represents the sum of the reversible mr and rm triad sequences.

The presence of 2,1 erythro regio defects was indicated by the presence of the two methyl sites at 17.7 and 17.2 ppm and confirmed by other characteristic sites.

Characteristic signals corresponding to other types of regio defects were not observed.

The amount of 2,1 erythro regio defects was quantified using the average integral of the two characteristic methyl sites at 17.7 and 17.2 ppm:

$P_{21e}=(I_{e6}+I_{e8})/2$

The amount of 1,2 primary inserted propene was quantified based on the methyl region with correction undertaken for sites included in this region not related to primary insertion and for primary insertion sites excluded from this region:

$$P_{12}=I_{CH3}+P_{12e}$$

The total amount of propene was quantified as the sum of primary (1,2) inserted propene and all other present regio defects:

$$P_{total}=P_{12}+P_{21e}$$

The mole percent of 2,1 erythro regio defects was quantified with respect to all propene:

$$[21e] \text{ mol }\%=100*(P_{21e}/P_{total})$$

Characteristic signals corresponding to the incorporation of $C_{5-12}$ alpha-olefin were observed. The amount isolated $C_{5-12}$ alpha-olefin incorporated in $PPC_{5-12}PP$ sequences was quantified using the integral of the corresponding sites accounting for the number of reporting sites per comonomer.

The amount isolated 1-hexene incorporated in PPHPP sequences was quantified using the integral of the αB4 sites at 44.1 ppm accounting for the number of reporting sites per comonomer:

$$H=I[\alpha B4]/2$$

With sites indicative of consecutive incorporation not observed the total 1-hexene comonomer content was calculated solely on this quantity:

$$H_{total}=H$$

The amount isolated 1-octene incorporated in PPOPP sequences was quantified using the integral of the αB6 sites at 44.0 ppm accounting for the number of reporting sites per comonomer:

$$O=I[\alpha B6]/2$$

With sites indicative of consecutive incorporation not observed the total 1-octene comonomer content was calculated solely on this quantity:

$$O_{total}=O$$

Characteristic signals corresponding to the incorporation of ethylene were observed. The amount isolated ethylene incorporated in PPEPP sequences was quantified using the integral of the Sαγ sites at 37.8 ppm accounting for the number of reporting sites per comonomer:

$$E=I[S\alpha\gamma]/2$$

The amount consecutively incorporated ethylene in PPEEPP sequences was quantified using the integral of the Sβδ site at 26.9 ppm accounting for the number of reporting sites per comonomer:

$$EE=IS\beta\delta$$

Sites indicative of further types of ethylene incorporation e.g. PPEPEPP and PPEEEPP were quantified from characteristic signals as EPE and EEE and accounted for in a similar way as PPEEPP sequences. The total ethylene comonomer content was calculated based on the sum of isolated, consecutive and non consecutively incorporated ethylene:

$$E_{total}=E+EE+EPE+EEE$$

The total mole fraction of comonomer in the polymer was calculated as:

$$f_E=(E_{total}/(E_{total}+P_{total}+C_{5-12;\,total})$$

$$f_{C5-12}=(E_{total}/(E_{total}+P_{total}+C_{5-12;\,total})$$

The mole percent comonomer incorporation in the polymer was calculated from the mole fraction according to:

$$[C_{5-12}] \text{ mol }\%=100*f_{C5-12}$$

$$[E] \text{ mol }\%=100*f_E$$

The weight percent 1-hexene and ethylene incorporation in the polymer was calculated from the mole fraction according to:

$$[H] \text{ wt }\%=100*(f_H*84.16)/((f_E*28.05)+(f_H*84.16)+((1-(f_E+f_H))*42.08))$$

$$[E] \text{ wt }\%=100*(f_E*28.05)/((f_E*28.05)+(f_H*84.16)+((1-(f_E+f_H))*42.08))$$

The weight percent 1-octene and ethylene incorporation in the polymer was calculated from the mole fraction according to:

$$[O] \text{ wt }\%=100*(f_O*112.21)/((f_E*28.05)+(f_O*112.21)+((1-(f_E+f_O))*42.08))$$

$$[E] \text{ wt }\%=100*(f_E*28.05)/((f_E*28.05)+(f_O*112.21)+((1-(f_E+f_O))*42.08))$$

2. Amount of Xylene Solubles (XS, Wt.-%)

The amount of xylene solubles was determined at 25° C. according ISO 16152; first edition; 2005-07-01.

3. MFR (230° C., 2.16 kg)

Melt flow rate MFR (230° C., 2.16 kg) was measured according to ISO 1133 (230° C., 2.16 kg load).

4. Melting Temperature ($T_m$) and Melting Enthalpy ($\Delta H_m$), Crystallization temperature ($T_c$) and crystallization enthalpy ($\Delta H_c$):

Measured with Mettler TA820 differential scanning calorimetry (DSC) on 5 to 10 mg samples. DSC is run according to ISO 3146/part 3/method C2 in a heat/cool/heat cycle with a scan rate of 10° C./min in the temperature range of +23 to +210° C. Crystallization temperature and crystallization enthalpy are determined from the cooling step, while melting temperature and melting enthalpy are determined from the second heating step. Melting and crystallization temperatures were taken as the peaks of endotherms and exotherms.

5. Impact Properties of the Film

Peak force, deformation at peak force, energy to peak force, deformation at total penetration energy and total penetration energy/film thickness were measured at 23° C. according to ISO 7765-2. The instrumented puncture test was performed with a speed of 4.4 m/s.

6. Film Tear Resistance

Relative tear resistance in machine direction (MD) and transverse direction (TD) were measured according to ISO 6383-2.

7. Sealing Initiation Temperature (SIT):

The method determines the sealing temperature range (sealing range) of polymer films. The sealing temperature range is the temperature range, in which the films can be sealed according to conditions given below.

The lower limit (heat sealing initiation temperature (SIT)) is the sealing temperature at which a sealing strength of >1 N is achieved. The upper limit (sealing end temperature (SET)) is reached, when the films stick to the sealing device.

The sealing range is determined on a DTC Hot tack tester Model 52-F/201 with a three-layered film (a base layer and two sealing layers on each side of the base layer; base layer thickness: 25 μm; thickness of each sealing layer: 12.5 μm) with the following further parameters:

| Specimen width: | 25 mm |
| --- | --- |
| Seal Pressure: | 0.66 N/mm² |
| Seal Time: | 1 sec |
| Cool time: | 30 sec |

(Cool time: Time between sealing and testing (measuring of sealing strength). The films are cooled down at room temperature for 30 sec.)

| Peel Speed: | 42 mm/sec |
| --- | --- |
| Start temperature: | 80° C. |
| End temperature: | 150° C. |

The multi-layered film is folded or lapped on itself and an area of the overlapped film is then sealed at each sealbar temperature and seal strength (force) is determined at each step.

8. Intrinsic viscosity is measured according to DIN ISO 1628/1, October 1999 (in Decalin at 135° C.).

9. Calculation of comonomer content, xylene solubles XS and MFR (2.16 kg, 230° C.) of the individual propylene polymer fractions P2 and P3, respectively Calculation of comonomer content of the propylene polymer fraction P2:

$$\frac{C(P1+P2) - w(P1) \times C(P1)}{w(P2)} = C(P2) \qquad (I)$$

wherein
  w(P1) is the weight fraction [in wt.-%] of the propylene polymer fraction P1 in the blend of propylene polymer fractions P1 and P2,
  w(P2) is the weight fraction [in wt.-%] of the propylene polymer fraction P2 in the blend of propylene polymer fractions P1 and P2,
  C(P1) is the comonomer content [in wt.-%] of the propylene polymer fraction P1,
  C(P1+P2) is the comonomer content [in wt.-%] of the blend of propylene polymer fractions P1 and P2,
  C(P2) is the calculated comonomer content [in wt.-%] of the propylene polymer fraction P2.

Calculation of the amount of xylene solubles XS of the propylene polymer fraction P2:

$$\frac{XS(P1+P2) - w(P1) \times XS(P1)}{w(P2)} = XS(P2) \qquad (II)$$

wherein
  w(P1) is the weight fraction [in wt.-%] of the propylene polymer fraction P1 in the blend of propylene polymer fractions P1 and P2,
  w(P2) is the weight fraction [in wt.-%] of the propylene polymer fraction P2 in the blend of propylene polymer fractions P1 and P2,
  XS(P1) is the amount of xylene solubles XS [in wt.-%] of the propylene polymer fraction P1,
  XS(P1+P2) is the amount of xylene solubles XS [in wt.-%] of the blend of propylene polymer fractions P1 and P2,
  XS(P2) is the calculated amount of xylene solubles XS [in wt.-%] of the propylene polymer fraction P2.

Calculation of melt flow rate MFR₂ (230° C.) of the propylene polymer fraction P2:

$$MFR(P2) = 10^{\left[\frac{\log(MFR(P1+P2)) - w(P1) \times \log(MFR(P1))}{w(P2)}\right]} \qquad (III)$$

wherein
  w(P1) is the weight fraction [in wt.-%] of the propylene polymer fraction P1 in the blend of propylene polymer fractions P1 and P2,
  w(P2) is the weight fraction [in wt.-%] of the propylene polymer fraction P2 in the blend of propylene polymer fractions P1 and P2,
  MFR (P1) is the melt flow rate MFR₂ (230° C.) [in g/10 min] of the propylene polymer fraction P1,
  MFR (P1+P2) is the melt flow rate MFR₂ (230° C.) [in g/10 min] of the blend of propylene polymer fractions P1 and P2,
  MFR (P2) is the calculated melt flow rate MFR₂ (230° C.) [in g/10 min] of the propylene polymer fraction P2.

Calculation of comonomer content of the propylene polymer fraction P3:

$$\frac{C(P1+P2+P3) - w(P1+P2) \times C(P1+P2)}{w(P3)} = C(P3) \qquad (IV)$$

wherein
  w(P1+P2) is the weight fraction [in wt.-%] of the amount of propylene polymer fractions P1 and P2 in the blend of propylene polymer fractions P1, P2 and P3,
  w(P3) is the weight fraction [in wt.-%] of the propylene polymer fraction P3 in the blend of propylene polymer fractions P1, P2 and P3,
  C(P1+P2) is the comonomer content [in wt.-%] of the blend of propylene polymer fractions P1 and P2,
  C(P1+P2+P3) is the comonomer content [in wt.-%] of the blend of propylene polymer fractions P1, P2 and P3,
  C(P3) is the calculated comonomer content [in wt.-%] of the propylene polymer fraction P3.

II. Preparation of Multi-Layered Film Samples

Three-layered blown films were prepared on a three layer blown film line via co-extrusion. The melt temperatures of the sealing layers (SL) were 195° C. to 205° C.

The melt temperature of the base layer was in the range of 210° C. to 220° C. The throughput of the extruders was in sum 80 kg/h. The die temperature was 195° C., the blow-up ratio 1:3 and the frost line distance 460 mm. The layer sequence was as follows:

Sealing Layer-Base Layer-Sealing Layer

The sealing layers were identical.

The layer thickness has been determined by Scanning Electron Microscopy.

In all samples prepared, i.e. Inventive Examples IE1 to IE4 and Comparative Examples CE1 to CE6, the base layer had a thickness of 25 μm and was made of the commercial polypropylene random copolymer RB707CF of Borealis AG having a melt flow rate MFR₂ (230° C.) of 1.5 g/10 min and a melting temperature Tm of 145° C.

In Comparative Example CE1, each sealing layer was made of the commercial propylene-ethylene-1-butene terpolymer TD210BF of Borealis AG having a melt flow rate MFR₂ (230° C.) of 6 g/10 min and a melting temperature Tm of 131° C.

In Comparative Example CE2, each sealing layer was made of the commercial random ethylene-propylene copolymer RB709CF of Borealis AG having a melt flow rate MFR$_2$ (230° C.) of 1.5 g/10 min and a melting temperature Tm of 140° C.

In Inventive Examples IE1 to IE4 and Comparative Examples CE3 to CE6, the sealing layer polypropylenes were prepared by using a metallocene catalyst as described in example 10 of WO 2010/052263A1.

Reaction conditions used for preparing IE1 to IE4 and CE3 to CE6 are summarized in Table 1:

TABLE 1

| | Example | CE3 | CE4 | CE5 | CE6 | IE1 | IE2 | IE3 | IE4 |
|---|---|---|---|---|---|---|---|---|---|
| Loop | Reactor temperature (° C.) | 70 | 70 | 70 | 70 | 70 | 75 | 70 | 75 |
| | MFR2 (g/10 min) | 4.3 | 4.6 | 4.0 | 3.4 | 3.3 | 4.0 | 4.3 | 4.0 |
| | C6 content (wt %) | 0 | 0 | 1.2 | 1.1 | 1.6 | 0 | 1.7 | 0 |
| | Split loop/(loop + GPR1) % | 34 | 39 | 45 | 47 | 46 | 47 | 49 | 49 |
| | Split with respect to final reactor blend (%) | 34 | 39 | 45 | 47 | 30 | 23 | 38 | 29 |
| GPR1 | Reactor temperature (° C.) | 85 | 85 | 85 | 85 | 85 | 85 | 85 | 85 |
| | MFR2 (g/10 min) | 13 | 10.0 | 8.4 | 8.2 | 9.8 | 5.4 | 9.7 | 7.1 |
| | C6 content, total (wt %) | 3.9 | 3.7 | 4.9 | 4.3 | 4.8 | 5.0 | 5.3 | 5.0 |
| | calculated C6 content in GPR fraction, (wt %) | 5.9 | 6.0 | 7.9 | 7.1 | 7.5 | 9.4 | 8.7 | 9.8 |
| | Split GPR1/(loop + GPR1) % | 66 | 61 | 55 | 53 | 54 | 53 | 51 | 51 |
| | Split with respect to final reactor blend (%) | 66 | 61 | 55 | 53 | 36 | 27 | 39 | 31 |
| GPR2 | Reactor temperature (° C.) | | | | | 80 | 80 | 80 | 80 |
| | C2/C3 ratio feed GPR2 (kg/kg) | | | | | 0.3 | 0.3 | 0.3 | 0.2 |
| | Split % | | | | | 34 | 50 | 23 | 40 |

The properties of the polypropylene materials forming the sealing layers in IE1-4 and CE3-6 are summarized in Table 2:

TABLE 2

| Ex. | CE3 | CE4 | CE5 | CE6 | IE1 | IE2 | IE3 | IE4 |
|---|---|---|---|---|---|---|---|---|
| C6 (wt % - NMR) | 3.9 | 3.7 | 4.9 | 4.3 | 3.3 | 2.6 | 4.2 | 3.1 |
| C2 (wt % - NMR) | — | — | — | — | 3.4 | 4.1 | 2.1 | 2.5 |
| C6 (mol % -NMR) | 2.0 | 1.9 | 2.5 | 2.2 | 1.7 | 1.5 | 2.2 | 1.6 |
| C2 (mol % - calc.) | — | — | — | — | 5.0 | 6.0 | 3.2 | 3.7 |
| Total comonomer (mol %) | 2.0 | 1.9 | 2.5 | 2.2 | 6.7 | 7.5 | 5.4 | 5.3 |
| C6 in XS (wt % - NMR) | | | | | 0.2 | 1.1 | 1.4 | 1.4 |
| C2 in XS (wt % - NMR) | | | | | 10.1 | 8.2 | 9.1 | 6.1 |
| XS (wt %) | 2.4 | 1.9 | 2.3 | 5.5 | 34.1 | 50 | 22.9 | 40.4 |
| INTRINSIC VISCOSITY OF XS (dL/g) | | | | | 0.98 | 1.10 | 0.96 | 1.24 |
| Tm (° C.) | 148 | 149 | 141 | 141 | 134.5 | 149 | 133.8 | 148.5 |
| Tc (° C.) | 111 | 101 | 97 | 100 | 95.3 | 98 | 96.5 | 98.5 |

The properties of the multi-layered film samples are summarized in Table 3.

TABLE 3

| Ex. | CE1 | CE2 | CE3 | CE4 | CE5 | CE6 | IE1 | IE2 | IE3 | IE4 |
|---|---|---|---|---|---|---|---|---|---|---|
| | | | | | Sealing Properties | | | | | |
| SEALING INITIATION TEMPERATURE (° C.) | 111 | 116 | 113 | 114 | 107 | 111 | 101 | 88 | 102 | 103 |
| SEALING END TEMPERATURE (° C.) | 124 | 122 | 120 | 128 | 110 | 120 | 122 | 120 | 116 | 112 |

TABLE 3-continued

| Ex. | CE1 | CE2 | CE3 | CE4 | CE5 | CE6 | IE1 | IE2 | IE3 | IE4 |
|---|---|---|---|---|---|---|---|---|---|---|
| Impact Properties | | | | | | | | | | |
| Peak force (N) | 49.3 | 55.5 | 55.4 | 52.5 | 56.6 | 54.9 | 54.4 | 54-5 | 54.8 | 59.1 |
| Deformation at peak force (mm) | 4.8 | 5.9 | 5.6 | 4.6 | 6 | 5.1 | 6.5 | 7.6 | 6.5 | 6.2 |
| Deformation at total penetration energy (mm) | 5 | 15 | 6.6 | 5 | 9.8 | 6.2 | 16.5 | 17.1 | 16.4 | 15.4 |
| Energy to peak force (J) | 0.1 | 0.1 | 0.1 | 0.1 | 0.1 | 0.1 | 0.2 | 0.2 | 0.2 | 0.2 |
| Total penetration energy/film thickness (J/mm) | 2 | 7.5 | 3.2 | 2.4 | 5.3 | 3.3 | 9.7 | 12.2 | 10.1 | 8.7 |
| Tear Resistance Properties | | | | | | | | | | |
| Relative tear resistance TD (N/mm) | 8.36 | 10.89 | 8.5 | 8.24 | 8.96 | 8.88 | 13.04 | 30.48 | 12.17 | 9.96 |
| Relative tear resistance MD (N/mm) | 2.93 | 3.2 | 4.2 | 3.67 | 4.71 | 4.35 | 5.95 | 5.92 | 4.95 | 4.85 |

As can be seen from Table 3, the multi-layered films according to the present invention have a lower seal initiation temperature as well as improved impact and tear resistance properties.

What is claimed is:

1. A multi-layered polymer film, comprising a sealing layer and a base layer,
wherein the sealing layer comprises a polypropylene, and wherein the sealing layer polypropylene SL-PP
comprises comonomer units derived from ethylene in an amount of from 0.5 wt % to 25 wt %, and from at least one $C_{5-12}$ alpha-olefin in an amount of from 0.5 mol % to 4.0 mol %, and
has an amount of xylene solubles XS of at least 20 wt %, and the xylene solubles have an amount of ethylene-derived comonomer units of from 4 wt % to 50 wt % and an amount of comonomer units which are derived from the at least one $C_{5-12}$ alpha-olefin of from 0.01 mol % to 2.0 mol %.

2. The multi-layered polymer film according to claim 1, wherein the at least one $C_{5-12}$ alpha-olefin is selected from 1-hexene, 1-octene, or any mixture thereof.

3. The multi-layered polymer film according to claim 1, wherein the sealing layer polypropylene complies with the following relation:

$$[C_2(XS) \times XS/100]/C_2(total) \geq 0.90$$

wherein
$C_2(XS)$ is the amount in wt % of the ethylene-derived comonomer units in the xylene solubles of the sealing layer polypropylene,
XS is the amount in wt % of xylene solubles of the sealing layer polypropylene,
$C_2(total)$ is the amount in wt % of the ethylene-derived comonomer units in the sealing layer polypropylene.

4. The multi-layered polymer film according to claim 1, wherein the sealing layer polypropylene complies with the following relation:

$$[C_{5-12}(XS) \times XS/100]/C_{5-12}(total) \leq 0.30$$

wherein
$C_{5-12}(XS)$ is the amount in wt % of the $C_{5-12}$ alpha-olefin-derived comonomer units in the xylene solubles of the sealing layer polypropylene,
XS is the amount in wt % of xylene solubles of the sealing layer polypropylene,
$C_{5-12}(total)$ is the amount in wt % of the $C_{5-12}$ alpha-olefin-derived comonomer units in the sealing layer polypropylene.

5. The multi-layered polymer film according to claim 1, wherein the total amount of comonomer units in the sealing layer polypropylene is from 1.7 mol % to 33 mol %.

6. The multi-layered polymer film according to claim 1, wherein the sealing layer polypropylene is a blend comprising the following propylene polymer fractions P1, P2 and P3:
(P1) a propylene homopolymer or a propylene copolymer comprising comonomer units derived from at least one $C_{5-12}$ alpha-olefin in an amount of less than 1.0 mol%,
(P2) a propylene copolymer comprising comonomer units derived from at least one $C_{5-12}$ alpha-olefin in an amount of from 2.0 mol % to 7.0 mol %, and
(P3) a propylene copolymer comprising ethylene-derived comonomer units in an amount of from 4 wt % to 50 wt %.

7. The multi-layered polymer film according to claim 1, having a sealing initiation temperature SIT of 110° C. or less.

8. The multi-layered polymer film according to claim 1, wherein the base layer comprises a polyvinyl alcohol, a poly(meth)acrylate, a polyamide, a poly(ethylene terephthalate), a polyolefin, or any mixture thereof.

9. The multi-layered polymer film according to claim 1, wherein the base layer comprises a polypropylene.

10. The multi-layered polymer film according to claim 1, wherein the base layer has a thickness in the range of 5 to 120 μm, and/or the sealing layer has a thickness in the range of 3 to 40 μm.

11. The multi-layered polymer film according to claim 1, wherein the multi-layered polymer film comprises three layers, namely a base layer, a sealing layer and (a) an outer layer being a polyolefin,
or
(b) a further sealing layers,
or
(c) a metal layer,
wherein the multi-layered polymer film has the following layer sequence:
(a1) sealing layer-base layer-outer layer,
or
(b1) sealing layer-base layer-sealing layer,
or
(c1) sealing layer-base layer-metal layer.

12. The multi-layered polymer film according to claim 1, being a cast film, a blown film, a biaxially oriented film, or a combination thereof.

13. The multi-layered polymer film according to claim 1, wherein the xylene solubles of the sealing layer polypropylene contain an amount of comonomer units which are derived from the least one $C_{5-12}$ alpha-olefin of from 0.05 mol % to 1.0 mol %.

14. The multi-layered polymer film according to claim 1, wherein the total amount of comonomer units, derived from ethylene and at least one $C_{5-12}$ alpha-olefin, in the sealing layer polypropylene is from 1.7 mol % to 33 mol %.

15. The multi-layered polymer film according to claim 1, wherein the total amount of comonomer units in the sealing layer polypropylene is from 2.5 mol % to 14 mol %.

16. The multi-layered polymer film according to claim 1, wherein the total amount of comonomer units, derived from ethylene and at least one $C_{5-12}$ alpha-olefin, in the sealing layer polypropylene is from 2.5 mol % to 14 mol %.

17. The multi-layered polymer film according to claim 1, wherein the sealing layer polypropylene is a reactor blend comprising the following propylene polymer fractions P1, P2 and P3:

(P1) a propylene homopolymer or a propylene copolymer comprising comonomer units derived from at least one $C_{5-12}$ alpha-olefin in an amount of less than 1.0 mol %,
(P2) a propylene copolymer comprising comonomer units derived from at least one $C_{5-12}$ alpha-olefin in an amount of from 2.0 mol % to 7.0 mol %, and
(P3) a propylene copolymer comprising ethylene-derived comonomer units in an amount of from 4 wt % to 50 wt %.

18. The multi-layered polymer film according to claim 1, having a sealing initiation temperature SIT of 105° C. or less.

19. The multi-layered polymer film according to claim 1, wherein the multi-layered polymer film consists of three layers, namely a base layer, a sealing layer and
(a) an outer layer being a polyolefin,
or
(b) a further sealing layers,
or
(c) a metal layer,
wherein the multi-layered polymer film has the following layer sequence:
(a1) sealing layer-base layer-outer layer,
or
(b1) sealing layer-base layer-sealing layer,
or
(c1) sealing layer-base layer-metal layer.

20. The multi-layered polymer film according to claim 10, wherein the ratio of the sealing layer thickness to the base layer thickness being in the range of from 1/10 to 9/10.

* * * * *